May 6, 1930. A. R. THOMPSON Re. 17,659

FRUIT PITTER

Original Filed March 17, 1924 6 Sheets-Sheet 1

A. R. THOMPSON

May 6, 1930. FRUIT PITTER Re. 17,659

6 Sheets-Sheet 2

Original Filed March 17, 1924

Inventor.
Albert R. Thompson
By Booth & Booth
Attorneys

May 6, 1930. A. R. THOMPSON Re. 17,659

FRUIT PITTER

Original Filed March 17, 1924 6 Sheets-Sheet 3

Inventor,
Albert R. Thompson
By Bartl & Bartl
Attorneys.

May 6, 1930.

A. R. THOMPSON

FRUIT PITTER

Original Filed March 17, 1924

Re. 17,659

6 Sheets-Sheet 4

Inventor.

Albert R. Thompson

By Booth & Booth

Attorneys.

May 6, 1930.

A. R. THOMPSON

FRUIT PITTER

Re. 17,659

Original Filed March 17, 1924

6 Sheets-Sheet 5

Inventor.

Albert R. Thompson

By Booth & Booth attorneys.

May 6, 1930.

A. R. THOMPSON

FRUIT PITTER

Re. 17,659

Original Filed March 17, 1924

6 Sheets-Sheet 6

INVENTOR

Albert R. Thompson

BY Booth & Booth

ATTORNEYS

Reissued May 6, 1930 Re. 17,659

UNITED STATES PATENT OFFICE

ALBERT R. THOMPSON, OF SAN JOSE, CALIFORNIA, ASSIGNOR TO ANDERSON-BARN-GROVER MFG. CO., OF SAN JOSE, CALIFORNIA, A CORPORATION OF CALIFORNIA

FRUIT PITTER

Original No. 1,545,216, dated July 7, 1925, Serial No. 699,751, filed March 17, 1924. Application for reissue filed January 25, 1927. Serial No. 163,545.

My invention relates to fruit pitting machines of the type in which the fruit and its pit are first halved, and the halves of the pit subsequently removed from the halves of the fruit.

Such machines are used principally for the pitting of peaches in preparation for canning, although they are equally well suited for the pitting of other similar fruits. Such fruits commonly have more or less flattened pits, and in order to avoid undue waste in the removal of the pit, as well as for the sake of appearance, the fruit must be cut in the plane of the greatest diameter of the pit. This plane is indicated upon the outside of the fruit by a more or less prominent depression or groove beginning at the stem cavity and extending toward the tip or apex. Some fruits, moreover, are not perfectly symmetrical, the plane of greatest diameter of the pit, as indicated by the exterior groove, lying to one side of the median line of the fruit itself. The principle of so feeding the fruit to a cutting instrumentality that it will always be halved accurately in the plane of greatest diameter of the pit, irrespective of whether or not such plane coincides with the true median line of the fruit, is set forth in United States Letters Patent No. 1,448,472, issued March 13, 1923, upon my application, and therefore, will be described hereinafter only to the extent which may be necessary to a full understanding of my present invention.

Broadly speaking, the object of my present invention is to provide a continuously operating machine for automatically halving the fruit and completely and accurately removing the pits therefrom with the least possible waste of the flesh of the fruit. I attain this object not only by making use of the principle set forth in said Patent No. 1,448,472, but also by providing means for feeding the fruit to the pitting instrumentalities in a certain fixed relation, viz, stem end first. It is well known that the pits of such fruits as peaches are positioned always at practically a fixed distance from the stem end, regardless of the thickness or exterior conformation of the flesh, so that, by feeding the fruit stem end first, the pitting instrumentalities can be more accurate and positive in their operation, resulting in less waste and less danger of cutting into or breaking the pit, than would be the case if the fruit were fed in any other position. The attainment of this desired object is further assisted by providing means for holding the fruit securely during the pitting operation, and by the shape and construction of the pitting knives, as will be fully explained hereinafter.

A further object of my invention is to provide means for removing the projecting tip or apex from the fruit, thus resulting in the practical elimination of all hand labor.

Other objects and advantages will become apparent from the following description of a preferred embodiment of my invention, it being understood that the form and construction of the described apparatus may be varied within the limits of the claims hereto appended, without effecting the principles of the invention.

With this in view, a machine embodying my present invention will now be fully described with reference to the accompanying drawings, wherein—

Figure 10 is a transverse section, enlarged, of the feed conveyor.

Figure 11 is a detail of the cup locking mechanism.

Figure 12 is a section of the same taken in the direction of the arrow on the line 12—12 of Figure 11.

Figure 13 is a perspective detail of one of the tip cutters associated with the feed conveyor.

Figure 14:
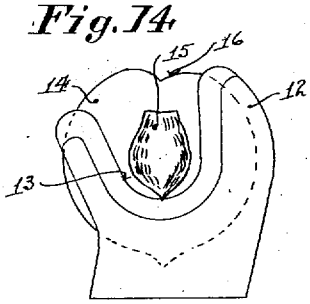
Figure 15:
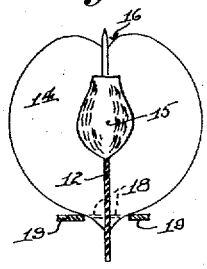
Figure 16:
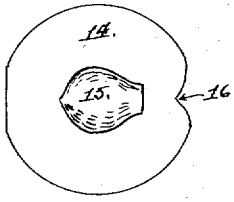
Figure 17:
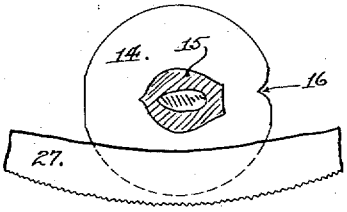
Figure 18:
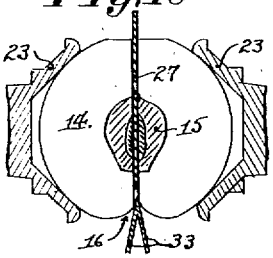
Figure 19:
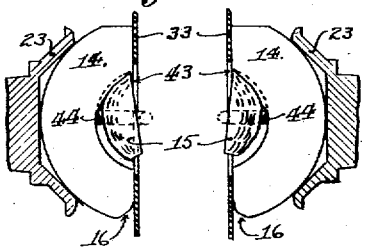
Figure 20:
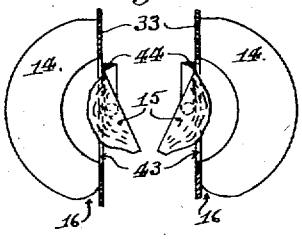
Figure 21:
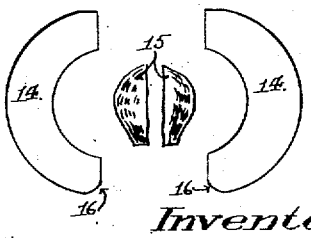

Figures 14 to 21 inclusive are diagrammatic views, partly in section, illustrating the various positions and conditions of the fruit resulting from the successive operations performed upon it, Figure 14 showing the fruit positioned upon the feed conveyor, Figure 15 showing the operation of the tip cutters; Figures 16 and 17 showing the positions of the fruit as viewed from the side at the beginning and end, respectively, of the halving operation; Figure 18 showing the halved fruit as viewed from the rear; Figure 19 showing the halved fruit being operated on by the pitting knives; Figure 20 showing the end of the pitting operation; and Figure 21 showing the final product.

Figure 3:
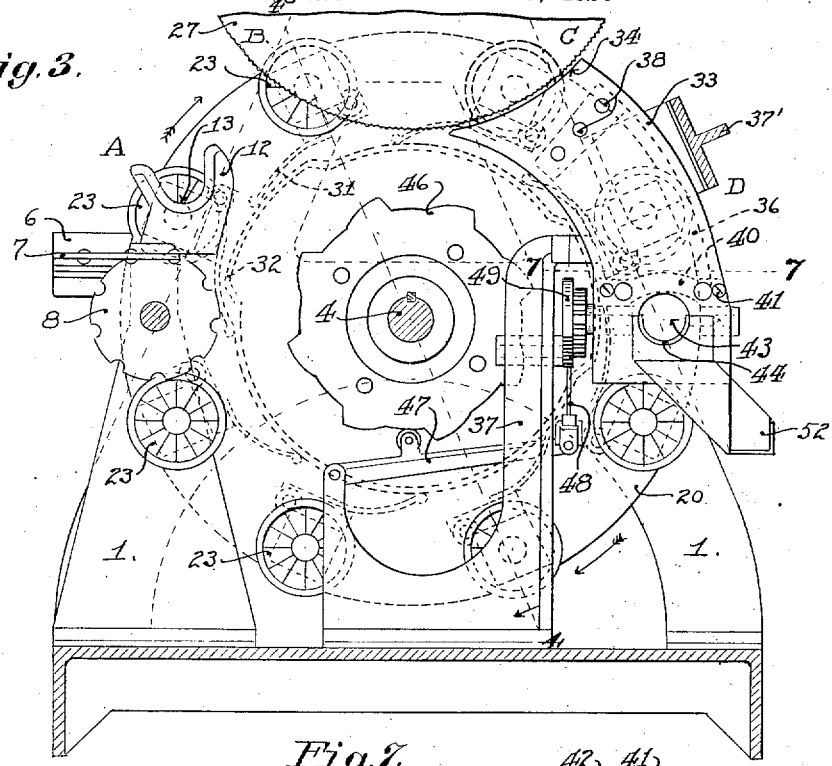
Figure 3 is a vertical section taken in the direction of the arrow on the line 3—3 of Figure 2.
Figure 22:
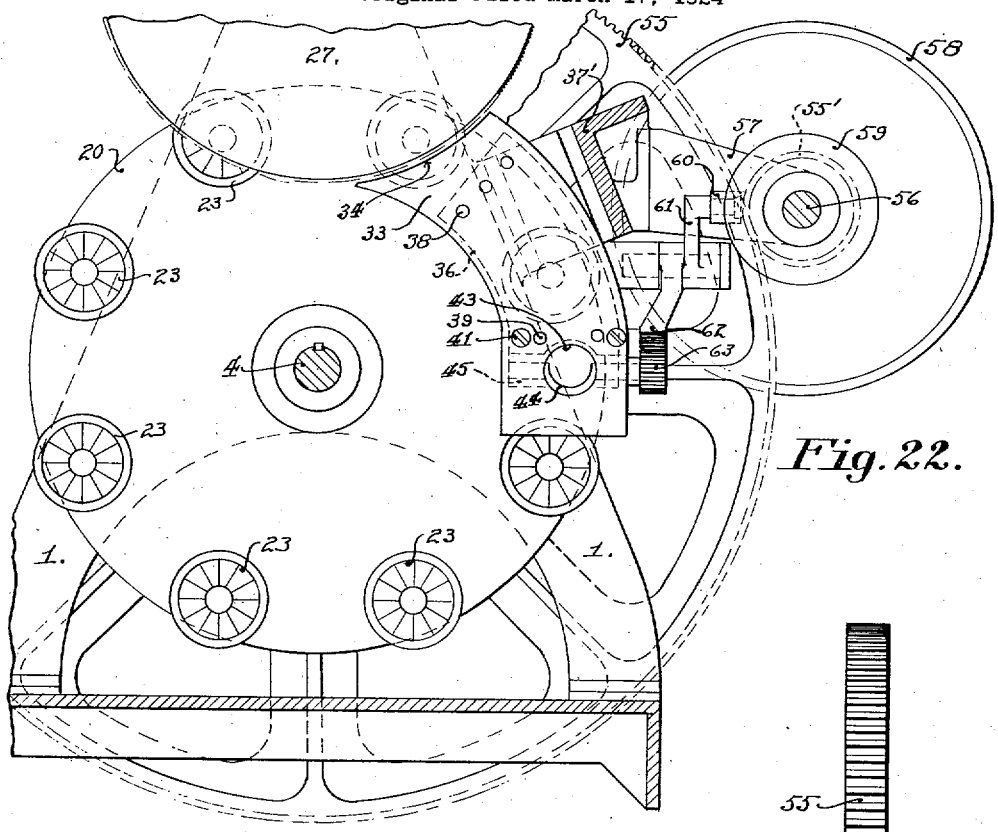

Figure 22 is a central vertical section, corresponding to Figure 3, showing a slightly different construction of the driving mechanism for the main shaft and the pitting knives, certain parts being omitted for the sake of clearness.

Figure 2:
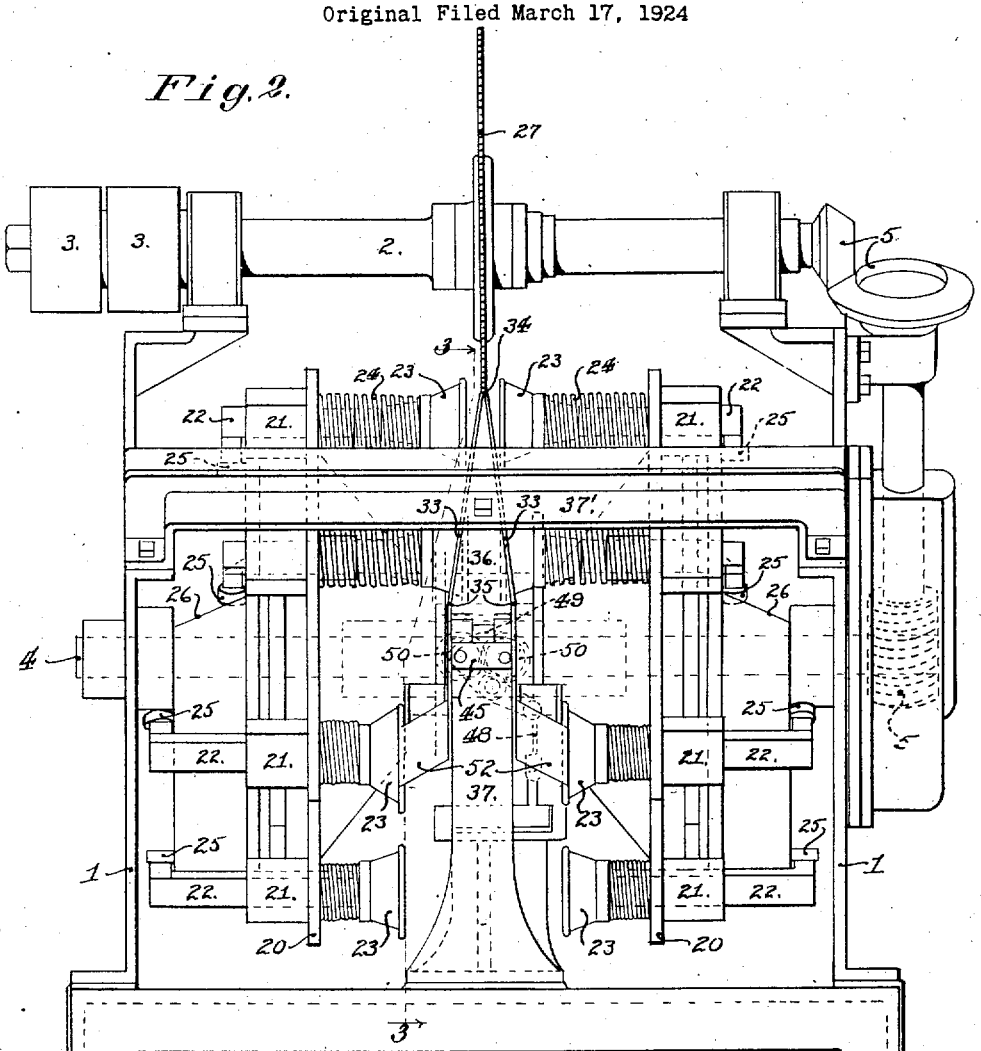
Figure 2 is a rear elevation of the same.
Figure 23:
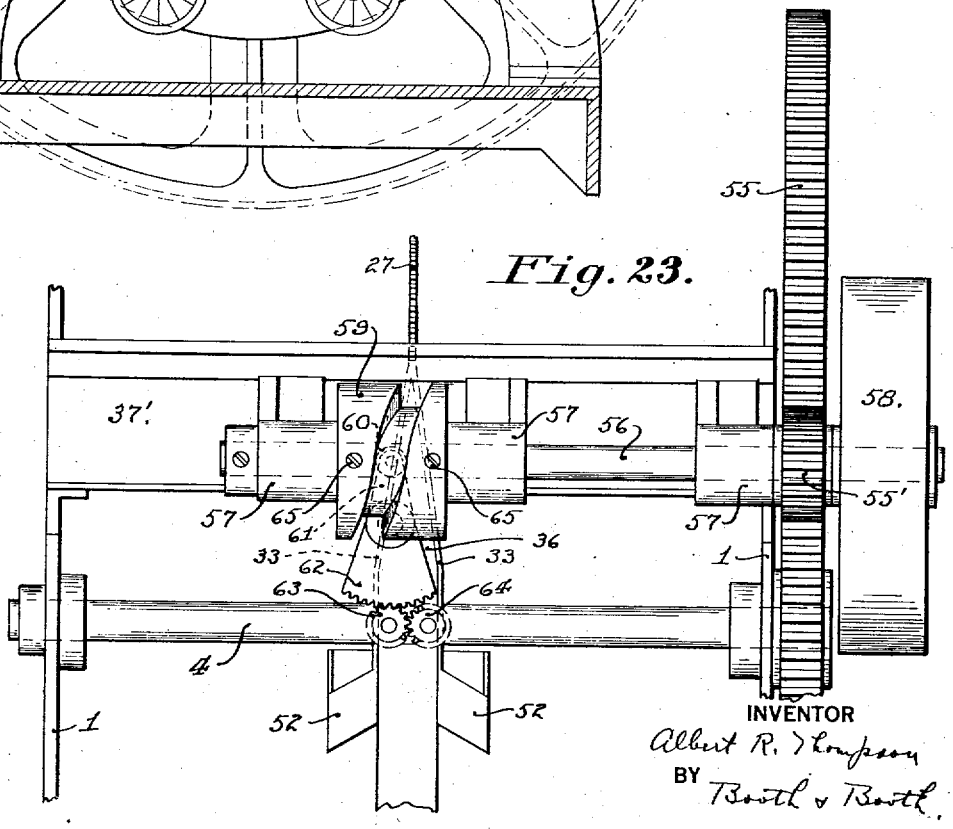

Figure 23 is a fragmentary rear elevation of the same, corresponding to Figure 2, with certain parts omitted for the sake of clearness.

Figure 1:
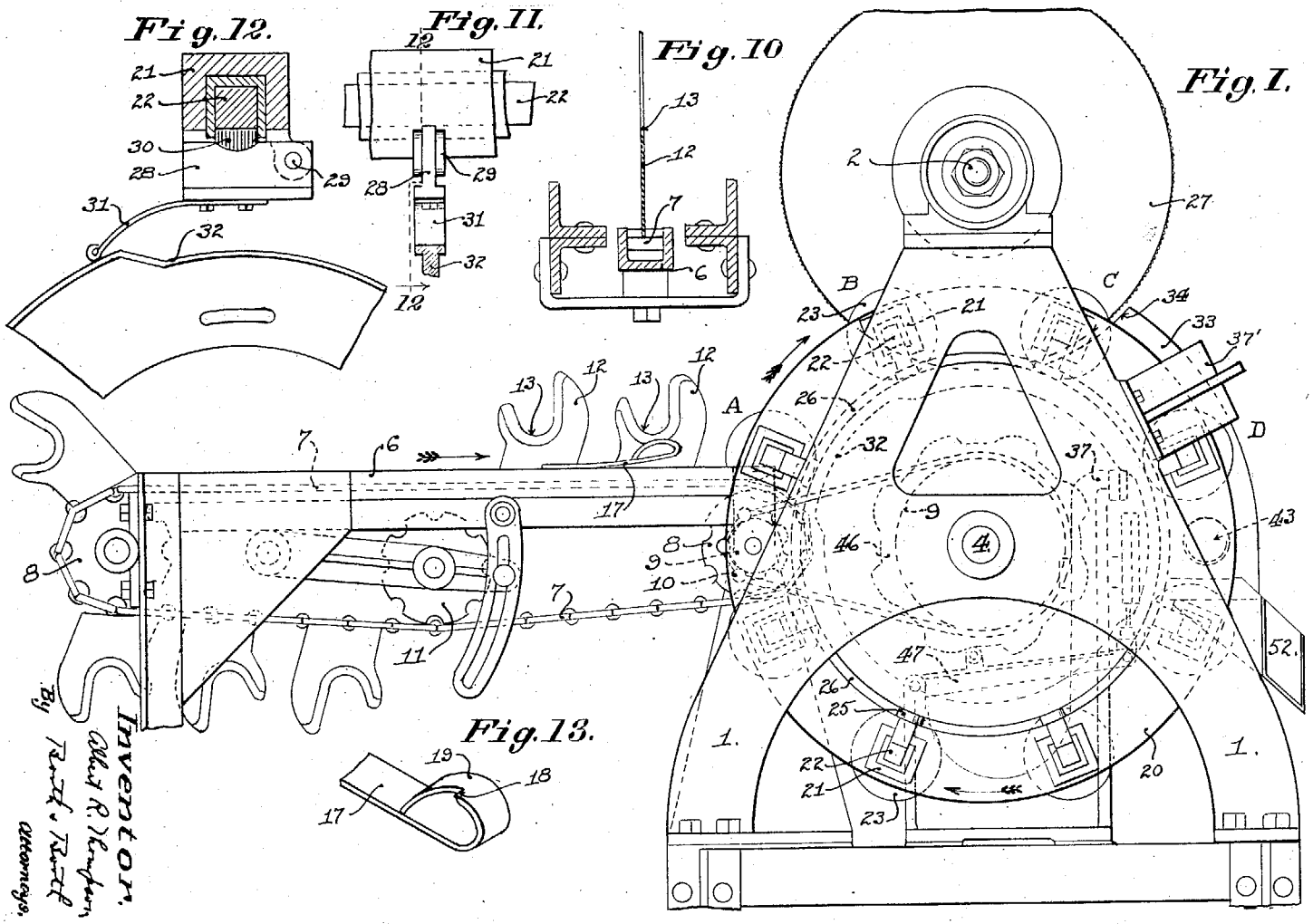
Figure 1 is a side elevation of my fruit pitter.

In the drawings, the reference numeral 1 designates a frame, in the upper portion of which is journaled a horizontal shaft 2 carrying means for receiving power from an outside source, such means being indicated in Figure 2 as comprising tight and loose pulleys 3. A second and lower horizontal shaft 4 is driven from the shaft 2, at a much slower speed, by suitable gearing indicated at 5. Extending from the front of the machine is a feed conveyor comprising a track 6, Figure 1, and an endless chain 7 whose upper run travels in said track as shown in Figures 1 and 10. Said chain is carried upon sprockets 8, Figure 1, and is driven, in timed relation to the movement of the shaft 4, by sprockets 9 and a chain 10. An adjustable tightener 11 is preferably provided for the conveyor chain 7.

The conveyor chain 7 carries a series of spaced fruit impaling and holding blades 12. Said blades are thin and flat, as shown in Figure 10, and are notched, as shown at 13 in Figures 1 and 3, the notched portion being sharpened to enable the fruit to be easily impaled. The fruit 14 is placed on the blades 12, manually or by any suitable means not shown, so that it is held in the position shown in Figures 14 and 15, with its pit 15 lying in the notch 13. Moreover, the fruit 14 is positioned with the center line of its pit 15, as determined by the exterior groove of the fruit, lying in the plane of the blade 12, and with its stem end 16 up, for reasons to be later set forth. The rear arm of the blade 12 is shorter than its forward arm, and is inclined rearwardly as shown, to enable the fruit to be lifted off said blade, by means to be presently described, while said blade is entering upon the angular portion of its travel about the rear conveyor sprocket 8. This enables the feed conveyor to operate with a continuous, rather than an intermittent motion, facilitating the placing of the fruit thereupon.

Secured upon the conveyor track 6 is a pair of cutters 17, Figure 1, one positioned on each side of the path of the blades 12. The function of said cutters is to slice off the tip or projection at the blossom end of the fruit, as indicated in Figure 15. Each such cutter is formed, as shown in Figure 13, preferably of spring steel or similar material, and has a cutting edge 18 lying in the path of the tip of the fruit, and a guide portion 19 adapted to ride upon the surface of the fruit adjacent to the tip to prevent the cutting edge 18 from cutting into the body of the fruit.

The shaft 4 carries a pair of spaced disks or spiders 20, Figures 1, 2, 3 and 4, in the peripheral regions of which are mounted in guides 21, a series of laterally slidable members 22, the members of the two disks being in horizontal alignment. Said members 22 are provided, at their inner or adjacent ends, with interiorly corrugated cups 23, the two cups of each pair of members being adapted to grip a fruit 14 between them, as shown in Figure 18. Springs 24, Figure 4, surrounding the members 22, cause them to move inwardly to embrace and hold the fruit.

The sliding members 22 are prevented from rotating in their guides 21, preferably by being made square in cross section. At their outer ends, said members carry rollers 25 adapted to ride upon stationary cams 26, by means of which said members are separated, at the proper times, to permit the fruit to be placed between and removed from the cups 23. The contour of the cams 26 is such that the cups 23 are held separated, as shown in the lower portion of Figure 4, during that portion of the revolution of the shaft 4, in the direction of the arrows in Figures 1 and 3, which carries said cups past the rear end of the feed conveyor. When any given pair of said cups reach the position A of Figures 1 and 3, they are permitted to be moved inwardly by their springs 24 to grip the fruit which has been placed between them by one of the conveyor blades 12. The fruit is then removed from said conveyor blade by said cups and carried to a knife or saw 27 at the position B, which is mounted upon the rapidly rotating shaft 2, and which operates between said cups, to bisect the fruit 14 and its pit 15 in the manner indicated in Figure 17.

As before stated, the fruit is placed upon the conveyor blade 12 with the medium line of its pit lying in the plane of said blade, irrespective of the symmetry or lack of symmetry of the flesh of the fruit about its pit. In order to maintain the fruit with the median line of its pit in the same plane, and to present it in this same plane to the saw 27, which lies in the plane of the conveyor blade, so that it will be halved in the plane of the median line, or greatest diameter of its pit, I provide means for locking the cup holding members 22 against lateral movement during that portion of their travel between the feed conveyor and the saw 27. Said locking means comprise, for each cup holding member 22, a bar 28, Figures 4, 11 and 12, pivotally mounted at 29 upon the guide 21, and a friction block 30 operating in a slot in said guide and interposed between the bar 28 and the slidable cup holding member 22, and adapted for frictional contact with the latter. The bar 28 carries a spring cam follower 31 adapted to ride upon a stationary cam 32, there being two such cams, one upon each side of the machine. The contour of said cams 32 is such that the cup holding members 22 are locked against lateral movement immediately after their cups 23 have closed upon a fruit at the position A, as indicated in Figures 1 and 3, but before the fruit is removed entirely from the conveyor blade upon which it is impaled, and such locking is continued until the halving operation is complete. The fruit is therefore presented to the saw 27 at the position B in the same vertical plane in which it is initially placed upon the conveyor blade 12.

When the halved fruit, still held by the cups 23, as indicated in Figure 18, leaves the saw 27 at the position C of Figures 1 and 3, its two halves pass on either side of a stationary dividing guide 33 whose upper or forward end 34 is adjacent to said saw and in vertical alignment therewith. This guide 33 is formed of two symmetrically disposed plates forming an inverted V, as shown in Figure 2, to spread apart the two halves of the fruit and their holding cups 23, as they travel downwardly thereover, the cams 32 having released the locking bars 28 to permit such spreading movement of the cups. The guide plates 33 are divergently inclined for a portion of their length, but at the points 35, Figure 2, they become parallel, and when the halved fruit reaches this parallel portion, at about the position D of Figures 1 and 3, its holding cups are again locked, by the action of the bars 28 and the cams 32, to prevent further spreading under the action of the pitting knives to be described presently.

Figure 7:
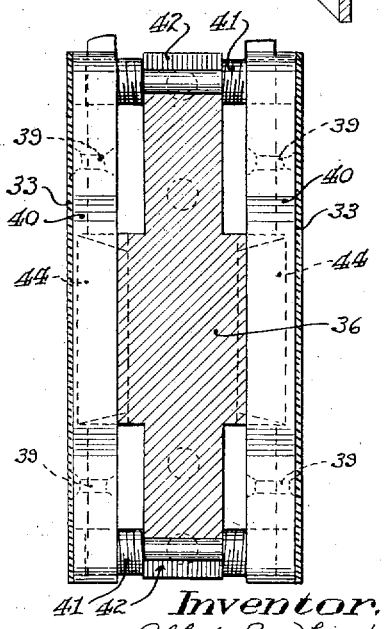
Figure 7 is a sectional plan view of the supporting member for the pitting knives and guide plates, and is taken on the line 7—7 of Figures 3 and 8.

The spreader guide plates 33 are mounted upon an intervening inverted V-shaped arcuate supporting member 36, Figures 2 and 3, which is carried by a fixed vertical bracket 37, and a fixed horizontal bracket 37′, Figure 2, the upper portions of said plates being riveted to said member 36 as shown at 38. Near its lower end, each plate 33 is fastened by rivets 39 to a transverse brace member 40, Figures 7, 8, and 9, and said brace members are carried upon right and left threaded screws 41 whose reduced central portions lie in slots 42 formed in the edges of the supporting member 36, so that, by adjusting said screws, the lower or parallel portions of the plates 33 may be shifted slightly toward or away from each other, for a purpose which will appear presently.

Figure 8:
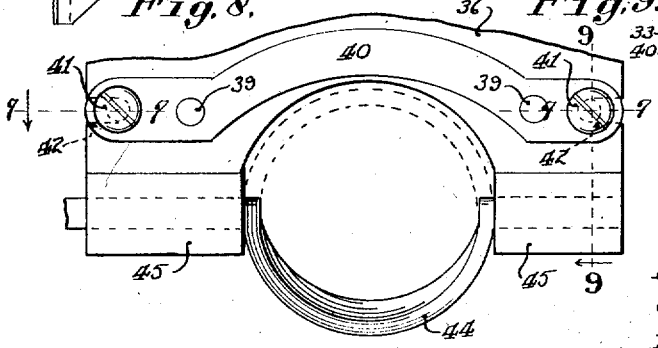
Figure 8 is a detailed elevation of one of the pitting knives and its supporting member, the guide plate being removed.
Figure 9:
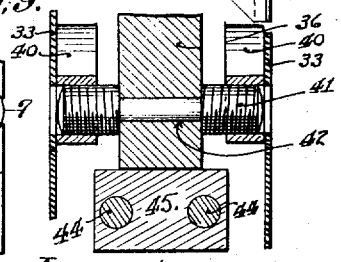
Figure 9 is a sectional detail taken in the direction of the arrow on the line 9—9 of Figure 8.
Figure 6:
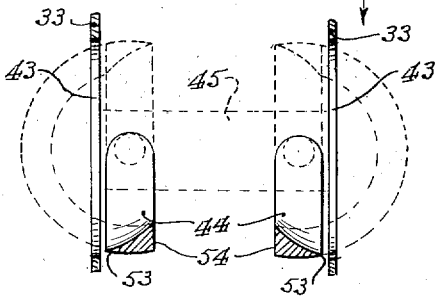
Figure 6 is a central vertical section, enlarged, of the pitting knives.

The guide plates 33 are provided, in their parallel portions, with aligned apertures 43, Figures 3 and 6. As the halved fruit passes over said apertures, the two halves of the pit are scooped or cut out, as indicated in Figure 20, by a pair of arcuate knives 44 which operate through said apertures. The pitting knives 44 are formed as shown in Figures 6 and 8, and are rotatably mounted in blocks 45 secured to the lower end of the guide plate supporting member 36. Said knives 44 are thus mounted between the guide plates 33, and normally do not project through the apertures 43, but as the halves of the fruit pass over said apertures, the knives are given a rotary motion of approximately 180 degrees, causing them to pass through said apertures and scoop out the half-pits passing thereover.

Figure 5:
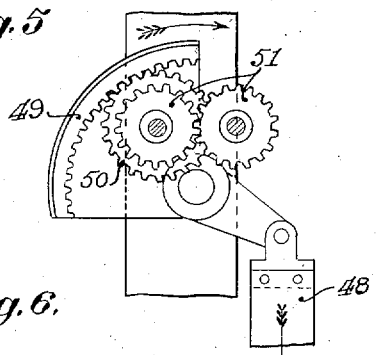
Figure 5 is a detailed end view of the pitting knife drive mechanism.
Figure 4:
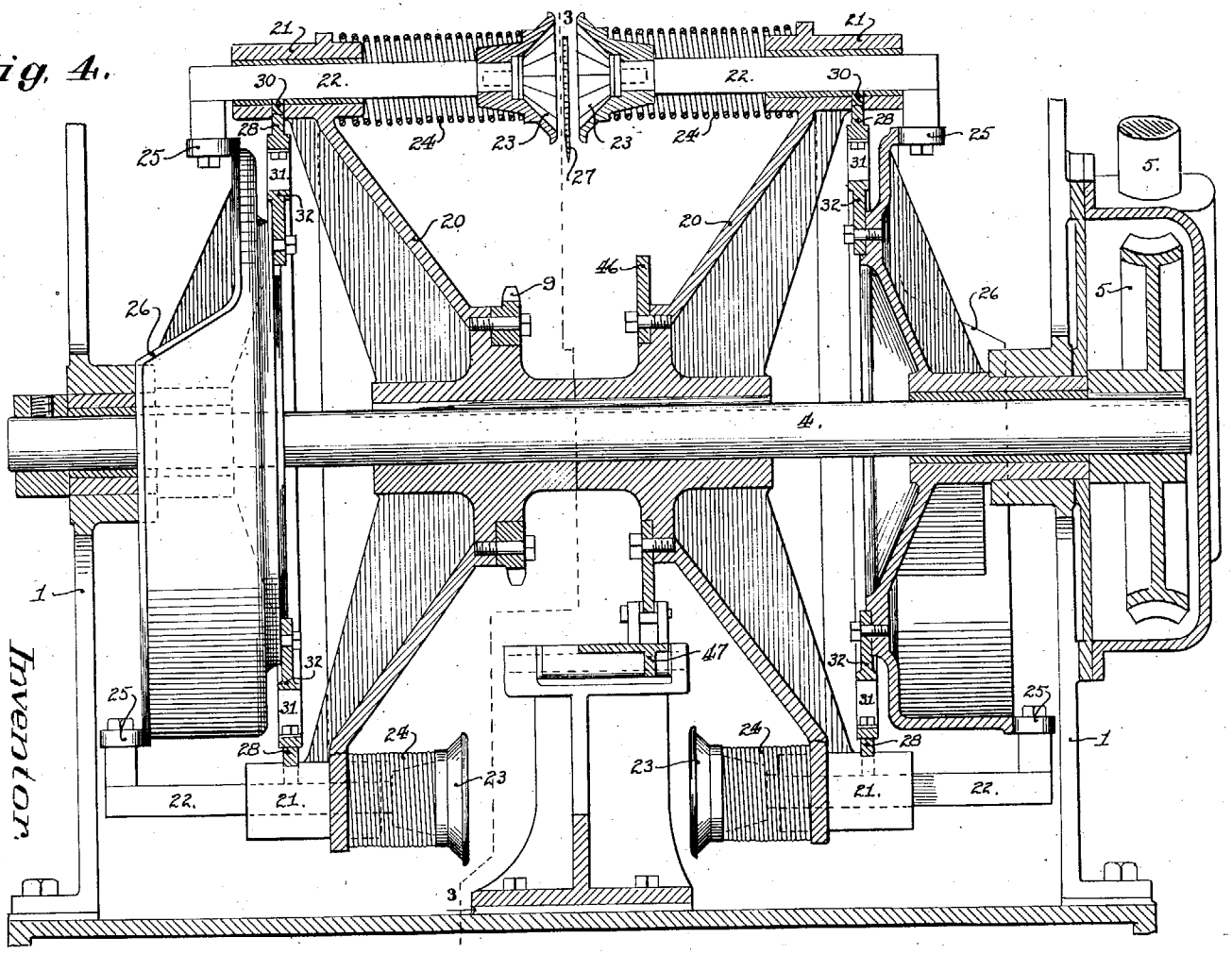
Figure 4 is a vertical section taken in the direction of the arrow on the line 4—4 of Figure 3 and enlarged.

This motion is imparted to the pitting knives 44 by a cam 46, Figures 1, 3, and 4, fixed upon one of the spiders 20. Said cam periodically depresses a lever 47, which is returned by a suitable spring, not shown, and the reciprocating motion of said lever is transmitted by a link 48 to a gear segment 49, Figures 2 and 5, which meshes with a pinion 50 fixed upon the spindle of one of the knives 44. Intermeshing pinions 51 cause both knives 44 to be oscillated simultaneously in opposite directions. As soon as the pitting operation is completed, the cups 23 are released by means of the cams 32, and are immediately separated by the cams 26, allowing the pitted halves of the fruit, now in the form shown in Figure 21, to fall into discharge chutes 52, Figures 1, 2, and 3. The halves of the pit fall down between said chutes to any suitable place of deposit not shown in the drawings.

The arcuate portions of the pitting knives 44 are formed with a steep taper from the sharp cutting edge 53 to the relatively thick back 54, as shown in Figure 6. This results in a combined tearing and cutting action in the removal of the pit, as illustrated in Figure 20, and effects the removal of the pit with the least possible amount of waste. On account of the fruit being halved in the plane of the median line of the pit, as above described, the two portions of the pit are symmetrical and of the same size, thus further assisting in the removal of said pit portions with the least possible waste. Moreover, the fruit having been placed on the feed conveyor blade 12 with its stem end up, it is presented to the pitting knives stem end first, and said knives moving upwardly in their cutting action, as shown in Figures 6 and 20, enter the fruit from its stem end. Since, as before stated, the pits are so positioned within the fruit as to be at a substantially fixed distance from the stem end, regardless of the exterior size and contour of the flesh, the action of the pitting knives, in entering the fruit from the stem end, is more accurate, and results in less waste and less danger of said knives striking the pit, than would be the case if the fruit were presented to said knives in any other position.

The adjustment of the lower parallel portions of the guide plates 33, by means of the screws 41 as described, enables the depth of the cut of the pitting knives to be closely regulated to further prevent waste; and finally, the action of the cams 32 in locking the cups 23 as the fruit is passed over the pitting knives, prevents said fruit from being forced outwardly by the action of said knives, and materially assists them to remove the pit accurately and without waste.

A simplified form of driving mechanism for the main shaft 4 and the pitting knives 44 is shown in Figures 22 and 23. In this construction the gearing 5 of Figure 2 is eliminated, and the shaft 4 is driven by a spur gear 55 and a pinion 55′, Figures 22 and 23, the latter being fixed upon a transverse shaft 56, which is mounted in suitable journals 57 supported by the transverse bracket 37′ and which is driven by any suitable means, as for example a belt, not shown, applied to a pulley 58 fixed upon said shaft.

The shaft 56 carries a grooved cam 59, in which rides a follower 60 carried upon a rocking arm 61. The lower portion of said arm carries a gear quadrant 62, which meshes with a pinion 63 secured upon the rear end of the spindle of one of the pitting knives 44, and said pinion 63 meshes with a similar pinion 64 secured to the other pitting knife. The cam 59 is preferably adjustable upon the shaft 56, as by means of set screws 65, Figure 23, to enable the movement of the pitting knives to be properly timed. This construction is not only simpler than that previously described but enables easy and quick dismounting, for repair or replacement, of the pitting knives 44, and their associated driving mechanism, all of which is accessibly located at the rear of the machine.

I claim:

1. A fruit pitter comprising means for cutting the fruit into two parts; means for removing the pit from the cut fruit; and means for receiving and holding the fruit, regardless of the relative position of the pit within the flesh by an engagement adapted for a predetermined positioning of the pit relatively to said cutting means and said pit removing means and means for presenting said fruit to said cutting and pit removing means without change of the relative position of the pit.

2. A fruit pitter comprising means for cutting the fruit into two parts; means for removing the pit from the cut fruit; a feed member to releasably hold the fruit, regardless of the relative position of the pit within the flesh by an engagement adapted for a predetermined positioning of the pit relatively to said cutting means and said pit removing means; and means for transferring the fruit from the feed member to the cutting means and the pit removing means without change of the predetermined relative position of the pit.

3. A fruit pitter comprising means for cutting the fruit into two parts; means for removing the pit from the cut fruit; a traveling feed member to releasably hold the fruit, regardless of the relative position of the pit within the flesh by an engagement adapted for a predetermined positioning of the pit relatively to said cutting means and said pit removing means; means for grasping the fruit and removing it from the holding member without change of the relative position of the pit; and means for effecting the travel of the grasping means in a path adapted to present the fruit to the cutting means and the pit removing means with its pit in the initial predetermined relative position.

4. A fruit pitter comprising means for cutting the fruit into two parts; means for removing the pit from the cut fruit; a traveling feed member to releasably hold the fruit, regardless of the relative position of the pit within the flesh, with its pit lying in the plane of said cutting means; means for removing the fruit from said feed member and presenting it to said cutting means without moving its pit out of said plane; and means for transferring the cut fruit from the cutting means to the pit removing means.

5. A fruit pitter comprising means for cutting the fruit into two parts; means for removing the pit from the cut fruit; a traveling feed member to releasably hold the fruit, regardless of its symmetry, with its pit lying in the plane of said cutting means; means for transferring the fruit from said feed member to said cutting means; means for preventing lateral movement of the fruit relatively to the plane of said cutting means during such transfer; and means for transferring the cut fruit from the cutting means to the pit removing means.

6. A fruit pitter comprising means for cutting the fruit into two parts; means for removing the pit from the cut fruit; a traveling feed member to releasably hold the fruit, regardless of its symmetry, with its pit lying in the plane of said cutting means; a pair of spaced members adapted to grasp the fruit, remove it from said feed member, and transfer it to the cutting means and the pit-removing means; means for preventing lateral movement of said grasping members relatively to the plane of said cutting means during the transfer of the fruit thereto; and means for preventing lateral movement of said grasping members during the operation of the pit removing means.

7. A fruit pitter comprising means for cutting the fruit into two parts; means for removing the pit from the cut fruit; a traveling feed member to releasably hold the fruit, regardless of its symmetry, with its pit lying in the plane of said cutting means; a pair of spaced members adapted to grasp the fruit, remove it from said feed member, and transfer it to the cutting means and the pit-removing means; means for preventing lateral movement of said grasping members relatively to the plane of said cutting means during the transfer of the fruit thereto; means for separating said grasping members and the cut portions of the fruit held thereby during the transfer from the cutting means to the pit removing means; and means for again preventing lateral movement of said grasping means during the operation of said pit removing means.

8. A fruit pitter comprising means for cutting the fruit into two parts; means for removing the pit from the cut fruit; means for transferring the cut fruit from the cutting means to the pit removing means; and means for locking said transferring means to prevent lateral movement of the cut fruit away from the pit removing means during the operation of the latter.

9. A fruit pitter comprising means for cutting the fruit into two parts; means for removing the pit from the cut fruit; a pair of traveling members adapted to grasp the fruit laterally and transfer it from the cutting means to the pit removing means; and means for locking said grasping members against lateral movement away from said pit removing means during the operation thereof.

10. A fruit pitter comprising a traveling notched blade adapted to impale and releasably hold the fruit with its pit lying in the notch of said blade, the sides of said notch being divergent toward its open end; means for cutting the fruit and removing the pit therefrom; and means for removing the fruit from said blade and transferring it to said cutting and pit removing means without changing the position of the pit relatively to the plane of said blade.

11. A fruit pitter comprising a traveling notched blade adapted to impale and releasably hold the fruit with its pit lying in the notch of said blade, the sides of said notch being divergent toward its open end, and the rear side being shorter than the forward side; means for cutting the fruit and removing the pit therefrom; and means for transferring the fruit from said blade to said cutting and pit removing means.

12. A fruit pitter comprising a traveling notched blade adapted to impale and releasably hold the fruit with its pit lying in the notch of said blade, the rear side of said notch sloping rearwardly toward its open end and said rear side being shorter than the forward side; means for cutting the fruit and removing the pit therefrom; and means for transferring the fruit from said blade to said cutting and pit removing means.

13. A fruit pitter comprising means for receiving and advancing the fruit; means for removing the pit therefrom; and trimming means for cutting off exterior projecting portions of said fruit, said trimming means being stationary relatively to the advancing fruit.

14. A fruit pitter comprising means for receiving and advancing a fruit; relatively stationary means positioned in the path of the advancing fruit for trimming off exterior projecting portions thereof; and means for removing the pit from said fruit.

15. A fruit pitter comprising means for receiving and advancing a fruit; a stationary knife positioned in the path of the advancing fruit for trimming off the projecting tip therefrom; and means for removing the pit from said fruit.

16. A fruit pitter comprising means for receiving and advancing a fruit; a knife positioned in the path of the advancing fruit for trimming off the projecting tip therefrom; a guard member associated with said knife to regulate the depth of its cut; and means for removing the pit from said fruit.

17. A fruit pitter comprising means for receiving and advancing a fruit; a resilient knife positioned in the path of the advancing fruit for trimming off the projecting tip therefrom; a guard member associated with said knife and adapted to coact with the surface of the fruit to automatically adjust the position of said knife; and means for removing the pit from said fruit.

18. A fruit pitter comprising a traveling impaling member adapted to hold and advance a fruit; a pair of knives, one positioned on each side of the path of said impaling member for trimming off the projecting tip of the fruit; and means for removing the pit from the said fruit.

19. A fruit pitter comprising means for cutting the fruit into two parts; a traveling member adapted to grasp one of said parts by engagement with its convex side; means adapted to enter said part from its cut side and remove the pit therefrom; and means for locking said grasping member against movement away from said pit removing means.

20. A fruit pitter comprising means for cutting the fruit into two parts; a traveling member adapted to grasp one of said parts by engagement with its convex side and convey the same away from said cutting means; means adapted to enter said part from its cut side and remove the pit therefrom; and means controlled by the travel of said grasping member for locking the same against lateral movement away from said pit removing means.

21. A fruit pitter comprising means for cutting the fruit into two parts; oppositely disposed traveling members adapted to grasp the fruit and convey it to and from said cutting means; means for spreading apart the cut portions of the fruit and said grasping members; means adapted to enter said fruit portions from their cut sides and remove the pit therefrom; and means for locking the grasping members to prevent lateral movement thereof away from said pit removing means during the operation of the latter.

22. A fruit pitter comprising means for cutting a fruit into two parts; means for holding a cut portion of said fruit; an arcuate pitting knife having a cutting edge and a relatively thick back; and mechanism for causing said knife to enter the fruit portion from its cut side and remove the pit therefrom, the thick back of said knife spreading the pit away from the flesh of the fruit, and its cutting edge severing the flesh adhering to said pit.

23. In a fruit pitter, an arcuate pit removing knife having a curvature approximately similar to that of the exterior of the pit, and having a cutting edge and a relatively thick portion behind said edge; and mechanism for causing said knife to enter the fruit and remove the pit therefrom, the thick portion of said knife spreading the pit away from the flesh of the fruit, and its cutting edge severing the flesh adhering to said pit.

24. A fruit pitter comprising means for halving the fruit and its pit; means for separating the halves of said fruit; devices for cutting out the halves of the pit from the halves of the fruit; means for adjusting the spacing of said separating means to regulate the depth of cut of said cutting devices; and means for preventing movement of the halves of the fruit away from said separating means during the operation of said cutting devices.

25. A fruit pitter comprising means for halving the fruit and its pit; a pair of divergent guide plates; means for grasping the halves of the fruit and advancing them over said guide plates; devices for cutting out the halves of the pit from the halves of the fruit; means for adjusting the spacing of said guide plates to regulate the depth of cut of said cutting devices; and means for locking said grasping means against movement away from said guide plates during the operation of said cutting devices.

26. A fruit pitter comprising means for halving the fruit and its pit; a pair of divergent guide plates, contiguous at one end and spaced at the other; a supporting member between said plates; means for grasping the halves of the fruit and advancing them over said guide plates toward their spaced ends; devices mounted in said supporting member for cutting out the halves of the pit from the halves of the fruit; and means for moving the spaced ends of said guide plates toward or away from said supporting member to regulate the depth of cut of said cutting devices.

27. A fruit pitter comprising means for halving the fruit and its pit; means for separating the halves of said fruit; a pair of arcuate rotatable knives for removing the halves of the pit from the halves of the fruit; intermeshing pinions fixed to said knives; a segmental gear meshing with one of said pinions; and means for oscillating said segmental gear.

28. A fruit pitter comprising means for halving the fruit and its pit; means for separating the halves of said fruit; a pair of arcuate rotatable knives for removing the halves of the pit from the haves of the fruit; intermeshing pinions fixed to said knives; a segmental gear meshing with one of said pinions, a cam follower carried by said segmental gear; and a rotatable grooved cam in which said follower is adapted to ride to cause said segmental gear to oscillate.

29. A fruit pitter comprising means for receiving and holding a fruit; means for cutting said fruit into two parts and removing the pit therefrom; a pair of oppositely disposed members adapted to grasp the fruit while held by said receiving means; a carrier member in which said grasping members are movably mounted; means for moving said carrier member to cause said grasping members to transfer the fruit from the receiving means to the cutting and pit removing means; and means for preventing the rotation of said grasping members in said carrier member.

30. A fruit pitter comprising means for receiving and holding a fruit; means for cutting said fruit into two parts and removing the pit therefrom; a pair of oppositely disposed interiorly corrugated cup members adapted to grasp the fruit while held by said receiving means; a carrier member in which said cup members are movably mounted; means for moving said carrier member to cause said cup members to transfer the fruit from the receiving means to the cutting and pit removing means; and means for preventing the rotation of said cup members in said carrier member.

31. A fruit pitter including pitting means shaped to conform approximately to a substantial portion of the pit in the plane of its suture, and mechanism to cause said pitting means to rotate about said pit comprising means independent of the sides of the pit to cause the pitting means to follow a predetermined path approximating the cross-sectional contour of the pit in a plane transverse to the axis of rotation of the pitting means.

32. A fruit pitter comprising a slotted blade upon which fruit may be manually impaled without removing a slice of flesh in a predetermined position with the fruit pit lying central of the plane of the blade and rotary curved pitting means disposed so as to cut into the flesh of the fruit on either side of said plane for removing the pit from the fruit.

Signed at Los Angeles, California, this 19th day of January, 1927.

ALBERT R. THOMPSON.